April 26, 1960 R. C. RUSSELL 2,933,951
TORQUE CONVERTER WITH DUAL-PURPOSE REACTION MEMBER
Filed June 5, 1953

INVENTOR.
ROBERT C. RUSSELL
BY Hudson, Boughton,
Williams, David & Hoffmann
ATTORNEYS

United States Patent Office 2,933,951
Patented Apr. 26, 1960

2,933,951

TORQUE CONVERTER WITH DUAL-PURPOSE REACTION MEMBER

Robert C. Russell, South Euclid, Ohio, assignor to Eaton Manufacturing Company, Cleveland, Ohio, a corporation of Ohio Application June 5, 1953, Serial No. 359,840

6 Claims. (Cl. 74—677)

This invention relates to power transmission devices, and more particularly, to a transmission of the combined hydraulic torque converter and mechanical gear train type in which cooperating relatively rotatable bladed annular members define a toroidal fluid circuit.

An object of the invention is to provide an improved transmission of this kind which is of a simple and practical construction, but in which an extended range of torque amplification will be obtainable, as well as a desired high value of torque amplification for the stall or starting condition of operation.

Another object is to provide an improved transmission of this character in which a minimum number of the bladed annular members is needed and include a dual-purpose member comprising a combined reaction member and runner or fluid coupling member.

A further object is to provide an improved transmission of the character above-indicated in which the turbine member is connected with an output shaft means by mechanical torque amplification gearing, preferably planetary gearing, and in which the dual-purpose member is inhibited against reverse rotation when acting as a reaction member and is connected in driving relation with the output shaft means when acting as a runner member.

Still another object is to provide an improved transmission of the kind mentioned above in which clutch means effective during the delivery of torque to the transmission by the output shaft means, enables the output shaft means to drive the turbine member and the dual-purpose member as pump members in accomplishing a braking function which utilizes the resistance of the vehicle engine.

Additionally, this invention provides an improved transmission of the character already mentioned above in which the curvature and relative inclination of the blades of the reaction member enable this member to accomplish its dual function.

The invention can be further briefly summarized as consisting in certain novel combinations and arrangements of parts hereinafter described and particularly set out in the claims hereof.

In the accompanying sheet of drawings, forming a part of this specification:

Figure 1:
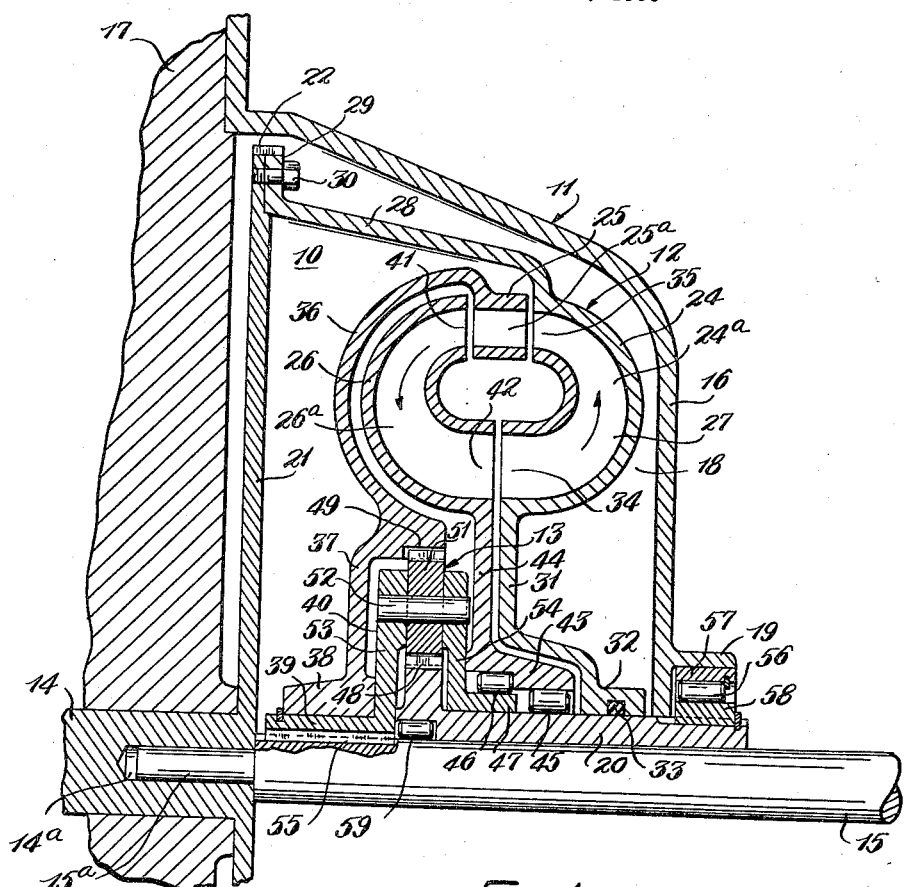
Fig. 1 is a partial vertical axial section taken through a transmission embodying the present invention.

The improved transmission 10 comprises in general, a stationary outer housing 11, a torque amplification device or converter 12 of the toroidal fluid circuit type and mechanical torque amplification gearing 13 associated with such torque converter. The transmission 10 also comprises a rotatable power input member or shaft 14 and a rotatable power output member or shaft 15.

The stationary outer housing 11 comprises a housing member 16 which is suitably secured to an adjacent structure 17, such as a portion of an internal combustion engine of a vehicle, and cooperates with the latter in defining the chamber 18. The housing member 16 is provided with a central hollow hub portion 19 from which a rotatable axial sleeve or hollow shaft member 20 extends into the housing structure 11 centrally thereof.

The rotatable power input member 14 comprises a driving member, such as the crankshaft of the vehicle engine, and carries a circular flange or flywheel member 21. The flywheel member 21 is located in the chamber 18 and is provided peripherally thereof with gear teeth 22 adapted to be engaged by the driving pinion of a conventional starting motor. The output shaft 15 is rotatably supported in axial alignment with the input shaft 14 by the sleeve member 20 and has a reduced end portion 15ª journalled in a bearing socket 14ª of the input shaft.

The torque converter 12 comprises a group of relatively rotatable bladed annular members 24, 25 and 26 in cooperating relation and defining a toroidal fluid path or circuit passage 27 interiorly of this device. The member 24 of this group is an annular pump member having an annular group of spaced blades or vanes 24ª therein and is adapted to be driven by the input shaft 14 with which this pump member is connected. For the purpose of this driving connection, the pump member 24 is provided with a generally axially extending annular wall portion 28 carrying a substantially radial flange 29 which is secured to the flywheel member 21 by the screws 30.

The pump member 24 also includes a substantially radial annular wall 31 having a central axial sleeve portion 32 rotatably journalled on the sleeve member 20. The sleeve portion 32 is provided interiorly thereof with a suitable packing ring 33 which extends around and sealingly engages the sleeve member 20.

The bladed portion of the pump member 24 which defines a portion of the toroidal fluid circuit 27 has an angular extent of approximately 180 degrees, as shown in Fig. 1. The portion 34 of this pump member constitutes an inlet portion for the hydraulic fluid, and the portion 35 constitutes the discharge portion of this pump member.

The annular member 25 is a turbine member carrying an annular group of spaced blades or vanes 25ª. The bladed portion of this turbine member defines a portion of the toroidal fluid circuit 27 which is of a relatively short angular extent and which is located on the side of the toroidal fluid circuit which is remote from the output shaft 15. The bladed portion of the turbine member 25 is located immediately adjacent the discharge portion 35 of the pump member 24, so as to receive directly from the latter the velocity stream of hydraulic fluid being delivered through such discharge portion.

The turbine member 25 also comprises a curved annular wall portion 36 which connects the bladed portion of this member with a substantially radially disposed annular wall 37. The annular wall 37 is provided substantially centrally thereof with a hollow hub 38 which is rotatably mounted on an axial sleeve member 39 of a carrier means 40 associated with the mechanical gear train 13.

The rotatable annular member 26 is a dual-purpose member comprising both a reaction member and a runner or fluid coupling member. The member 26 carries an annular group of spaced blades or vanes 26ª and the bladed portion of this member defines a portion of the toroidal fluid circuit 27 which is of approximately 180 degrees of angular extent and which extends between the turbine member 25 and the pump member 24. The bladed portion of the dual-purpose reaction member 26 has its inlet portion 41 located immediately adjacent the turbine member 25 and its outlet portion 42 located immediately adjacent the inlet portion 34 of the pump member 24.

The dual-purpose member 26 also comprises a hollow central axial hub 43 and a substantially radially extending wall 44 connecting the bladed portion of this member with such hub. The dual-purpose member 26 is rotatably supported by the annularly spaced rollers of a pair of roller-type clutch devices 45 and 46 located in the hollow hub 43. The rollers of the clutch device 45 are disposed between the hub 43 and the sleeve member 20. The rollers of the clutch device 46 are disposed between the hub 43 and an axial sleeve portion 47 of the carrier means 40.

The mechanical torque amplification gearing 13 connects the turbine member 25 with the output shaft 15 and, in this instance, is in the form of a planetary gear system which includes a sun gear 48 carried by the sleeve member 20, and a ring gear 49 carried by the turbine member 25. The gearing 13 also comprises a group of annularly spaced planet gears 51 disposed between and meshing with the sun gear 48 and the ring gear 49.

The planet gears 51 are carried by the carrier means 40 and are rotatably mounted on relatively short axially extending pivot pins 52. In addition to the above-mentioned axial sleeve portions 39 and 47, the carrier means 40 also comprises axially spaced radial flange portions 53 and 54 which are connected, respectively, with the sleeve portions 39 and 47. The radial flange portions 53 and 54 support, and are connected by, the pivot shafts 52 on which the planet gears 51 are rotatably supported in a position between these radial flanges. The sleeve portion 39 of the carrier means 40 is secured to the output shaft 15 by the spline connection 55.

The sun gear 48 and the sleeve member 20 are rotatable in a forward or clockwise direction in the housing member 16, but are inhibited against rotation in the reverse direction by a one-way brake 56 of the roller type. The rollers of the brake 56 are disposed between an outer race or collar 57 which is mounted in the hollow hub 19 and an inner race or collar 58 which is splined to the sleeve member 20.

The clutch device 45 is a one-way clutch means which prevents reverse rotation of the dual-purpose reaction member 26, such that this member will be held against reverse rotation when this member acts as a reaction member in the toroidal fluid circuit. The clutch device 46 is also a one-way clutch means and forms a driving connection for the transmission of torque from the dual-purpose member 26 in a forward or clockwise direction to the output shaft 15 through the carrier means 40 when the dual-purpose member is acting as a runner member or a fluid coupling member, as is further explained hereinafter.

The transmission 10 also comprises means by which torque can be transmitted from the output shaft 15 to the torque converter 12 in such a manner as to utilize the braking effect of the vehicle engine when this is desirable, such as when the accelerator has been released or when the vehicle is descending a hill. For the accomplishment of this braking function, the transmission 10 is provided with one-way clutch means 59 of the roller type which is disposed between the sun gear 48 and the output shaft 15. The clutch device 59 prevents rotation of the sun gear 48 and the sleeve member 20 in a forward direction relative to the output shaft 15 at a speed greater than that of the output shaft.

Thus, when torque is being transmitted through the output shaft 15 from the vehicle wheels to the torque converter 12, the clutch device 59 locks the sun gear 48 to the output shaft, such that the gearing 13 will form a drive connection between the output shaft and the turbine member 25 by which the latter will be driven as a pump member and will cause the torque load of the vehicle wheels to be transmitted to the vehicle engine through the pump member 24. During the time that the turbine member 25 is thus being driven as a pump member by the output shaft 15, the clutch device 45 will establish a driving connection with the dual-purpose member 26 by which this member will also be driven as a pump member by the output shaft and will assist the turbine member 25 in transmitting the torque of the output shaft to the vehicle engine through the pump member 24.

Figure 2:
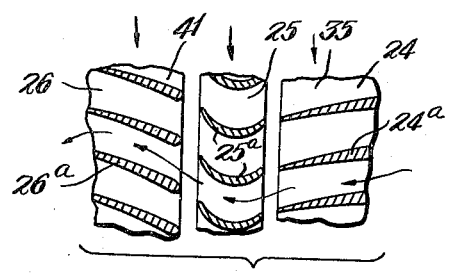
Fig. 2 is a fragmentary view of a diagrammatic nature illustrating the cooperation of the turbine member and the dual-purpose member with the discharge portion of the pump member.

Fig. 2 of the drawings diagrammatically illustrates the cooperation of the turbine member 25 and the inlet portion 41 of the dual-purpose member 26 with the discharge portion 35 of the pump member 24. This view also shows the inclination and blade curvature for the turbine member 25 and for the adjacent portions of the pump member 24 and the dual-purpose member 26. Although the blade angle and curvature can be varied to any extent desired, this view shows the portions of the blades 24a of the pump member as being substantially axially straight portions in the discharge portion 35 of this pump member. The blades 25a of the turbine member 25 are here shown as being concave or bucket-shaped blades against which the velocity discharge of the pump member 24 will be very effective in imparting forward rotation to this turbine member. This blade shape of the turbine member will also cause the velocity stream of fluid from the pump member 24 to be effectively directed into the inlet portion 41 of the dual-purpose reaction member 26. As is also shown in Fig. 2, the portions of the blades 26a which are in the inlet portion 41 of the reaction member 26 are concave or bucket-shaped, but in a reverse relation to the curvature of the blades 25a of the turbine member 25.

Figure 3:
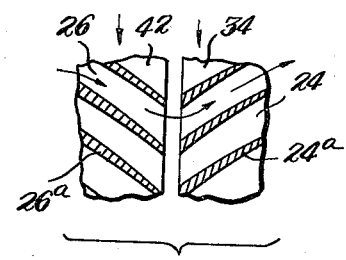
Fig. 3 is a fragmentary view of a diagrammatic nature illustrating the cooperation of the discharge portion of the dual-purpose member with the inlet portion of the pump member.

Fig. 3 shows the blade shape and inclination for the portions of the blades 24a of the pump member 24 which are located in the inlet portion 34 of this pump member and, likewise, shows the blade shape and inclination for the blade portions located in the discharge portion 42 of the reaction member 26. As here shown, the portions of the blades in these adjacent portions of the pump member 24 and the reaction member 26, are relatively straight but forwardly inclined blade portions. The inclination and shape of the blades 26a of the reaction member 26 will thus be such as to cause a relatively smooth flow of the hydraulic fluid from the turbine member 25 back to and into the inlet portion 34 of the pump member 24. The blade shape and inclination for the reaction member 26 will also effectively cause this member to act as a runner member during its forward rotation in transmitting torque to the output shaft 15.

From the construction of the transmission 10, as above described, it will be seen that the pump member 24, the turbine member 25 and the dual-purpose reaction member 26 are in a series relation in the toroidal fluid circuit 27, such that the stream of velocity fluid discharged by the pump member 24, will first pass through the bladed portion of the turbine member 25 and will then pass through the bladed portion of the reaction member 26 before being returned by the latter to the pump member.

Upon the starting of the vehicle engine, the input member 14 will drive the pump member 24 in a forward direction causing the high velocity fluid stream to be delivered by the pump member and the effect of this fluid stream on the turbine member 25 will cause the latter to be quickly accelerated to an operating speed which, acting through the torque amplification gearing 13, will cause a heavy torque to be supplied to the output shaft 15 at this starting or stall condition of operation. Assuming that the gearing 13 has a ratio of 1.6 to 1, the torque being developed by the turbine member 25 will be delivered to the output shaft 15 in accordance with this 1.6 to 1 ratio.

The blade shape and inclination for the bladed portion of the dual-purpose reaction member 26 is such that the fluid stream acting on the blades of the reaction member after passing through the turbine member 25, will produce a further torque amplification which may be as high as a 3 to 1 amplification ratio, but for practical purposes, can be here regarded as being a 2 to 1 amplification ratio. The total torque thus being delivered to the output shaft 15 during the stall or starting condition of operation, will be at approximately a 2×1.6=3.2 amplification ratio and which is a desired high value of torque amplification for the stall or starting condition.

During the starting condition of operation and immediately thereafter while the speed of rotation of the turbine member 25 is increasing, the curved shape of the blades of the turbine member will cause the velocity fluid stream to impinge against the concave faces of the blades of the reaction member 26 which, at this time, will be acting as a reaction member and will be held against reverse rotation by the clutch device 45. As the speed of the turbine member 25 increases, a condition of operation will be reached at which the direction of the velocity stream of fluid leaving the turbine member and acting against the blades of the inlet portion of the reaction member 26 will be such as to impinge against the convex faces of these blades and will cause the reaction member to begin to rotate in a forward direction and to begin to transmit torque to the output shaft 15 through the forward driving connection provided by the one-way clutch device 46. As the result of this change in the function of the dual-purpose member 26 from a reaction member in which its reverse rotation is inhibited by the one-way clutch device 45 to a runner member having a forward direction of rotation, the overall torque amplification ratio will gradually decrease until the torque amplification ratio becomes merely that provided by the mechanical gearing 13, namely, a 1.6 to 1 ratio. Depending upon variable load and speed factors, this condition of operation may occur at vehicle speeds on the order of 35 to 40 miles per hour. Since the reaction member 26 is connected in a direct forward driving relation with the output shaft 15 through the clutch device 46 and the carrier means 40, the reaction member is in a one-to-one ratio driving relation to the output shaft.

When the torque amplification value for the turbine member 25 has dropped to, or below, the 1.6 to 1 ratio of the mechanical gearing 13, and the forward direction of rotation of the reaction member 26 has increased, the turbine member 25 becomes substantially ineffective as a driving means and, thereupon, is merely carried around in a forward direction of rotation at a speed approximately that of the output shaft 15. During this running condition of operation, the turbine member 25 and the reaction member 26 will be rotated at approximately the same speed as the pump member 24 and the torque converter will then be functioning merely as a fluid coupling.

From the accompanying drawing and foregoing detailed description, it will now be readily understood that the improved transmission 10 is of a simple and practical construction utilizing a minimum number of the rotatable bladed annular members defining the toroidal fluid circuit, and is such that an increased range of torque amplification will be obtainable as well as a desired high torque amplification value for the starting or stall condition of operation. Likewise, it will be understood that this more simplified form of the improved transmission 10, results largely from the dual-purpose character of the reaction member 26 which enables this member to act as a reaction member when the maximum effectiveness of the turbine member 25 is desired or needed and to subsequently act as a runner member when the torque converter functions merely as a fluid coupling. Additionally, it will be seen that the improved transmission 10 also accomplishes an effective engine braking function through the driving of the turbine and reaction members as pump members when torque is transmitted through the output shaft from the vehicle wheels to the torque converter. Because of the high torque amplification ratio and extended range of torque amplification obtainable in the improved transmission 10, it will be seen that this device will permit an engine of a relatively smaller horsepower value to serve more effectively in propelling the vehicle and its load.

Although the improved transmission has been illustrated and described herein to a somewhat detailed extent, it will be understood, of course, that the invention is not to be regarded as being limited correspondingly in scope, but includes all changes and modifications coming within the spirit of the invention and the scope of the claims hereof.

Having thus described my invention, I claim:

1. In a power transmission mechanism; a group of relatively rotatable bladed annular members defining a toroidal fluid circuit and including pump means, turbine means and reaction means in series relation in said circuit; said reaction means being inhibited against reverse rotation; rotatable power input means connected with said pump means; rotatable output shaft means; torque amplification gearing of the planetary type connecting said turbine means with said output shaft means comprising ring gear means connected with said turbine means, a planet pinion carrier direct-connected to said output shaft means and sun gear means rotatable in a forward direction about said output shaft means; means inhibiting reverse rotation of said sun gear means; and one-way clutch means forming a forward drive connection between said output shaft means and said sun gear means such that torque transmitted to said sun gear means by said output shaft means will drive said turbine means as a pump means for vehicle braking purpose.

2. In a power transmission mechanism; a group of relatively rotatable bladed annular members defining a toroidal fluid circuit and including pump means, turbine means and a dual-purpose member in series relation in said circuit; said dual-purpose member being a combined reaction member and runner member; rotatable power input means connected with said pump means; rotatable output shaft means; torque amplification gearing of the planetary type connecting said turbine member with said output shaft means comprising ring gear means connected with said turbine means, a planet pinion carrier direct-connected to said output shaft means and sun gear means rotatable in a forward direction about said output shaft means; means inhibiting reverse rotation of said sun gear means; means inhibiting reverse rotation of said dual-purpose member when the latter is acting as a reaction member; means defining a drive connection effective in a forward direction at a one to one ratio between said dual-purpose member and said output shaft means when said dual-purpose member is acting as a runner member; and oneway clutch means forming a forward drive connection between said output shaft means and said sun gear means such that torque transmitted to said sun gear means by said output shaft means will drive said turbine means as a pump means for vehicle braking purpose.

3. Power transmission mechanism as defined in claim 1 and which includes one-way clutch means located between said reaction means and said sun gear means; the last mentioned clutch means being effective to inhibit the reverse rotation of said reaction means and to also cause said reaction means to be driven as a pump means by said output shaft means for said vehicle braking purpose.

4. Power transmission mechanism as defined in claim 2 and wherein the means inhibiting the reverse rotation of said dual-purpose member comprises one-way clutch means located between said sun gear means and said dual-purpose member; the last mentioned clutch means being also effective to cause said dual-purpose member to be driven as a pump means by said output shaft means for said vehicle braking purpose.

5. In a power transmission mechanism for a vehicle; a stationary outer housing; a group of relatively rotatable bladed annular members defining a toroidal fluid circuit and including pump means, turbine means, and reaction means in series relation in said circuit; rotatable power input means connected with said pump means; rotatable output shaft means; co-operating planetary gearing members operably connecting said turbine means with said output shaft means and comprising a ring gear rotatable with said turbine means, a sun gear, planet pinion means disposed between and having meshed engagement with said ring gear and sun gear, and carrier means supporting said pinion means and rotatable about the axis of said output shaft means; means associated with said housing and operable to prevent reverse rotation of said reaction means and sun gear; said sun gear and said carrier means being controllable members of said planetary gearing members; and one-way clutch means effective between one of said controllable members and said output shaft means such that torque transmitted through said clutch means to said one controllable member by said output shaft means will cause the planetary gearing to drive said turbine means as a pump means for vehicle braking purpose when the speed of rotation of said output shaft means tends to exceed the speed of rotation of said one controllable member.

6. In a power transmission mechanism for a vehicle; a group of relatively rotatable bladed annular members defining a toroidal fluid circuit and including pump means, turbine means, and reaction means in series relation in said circuit; rotatable power input means connected with said pump means; rotatable output shaft means; co-operating planetary gearing members operably connecting said turbine means with said output shaft means and comprising a ring gear rotatable with said turbine means, a sun gear, planet pinion means disposed between and having meshed engagement with said ring gear and sun gear, and carrier means supporting said pinion means and rotatable about the axis of said output shaft means; said sun gear and said carrier means being controllable members of said planetary gearing members; connecting means defining a drive connection at a one-to-one ratio between said reaction means and said output shaft means and including a first one-way clutch means effective in a forward driving direction between said reaction means and one of said controllable planetary gearing members; one-way brake means inhibiting reverse rotation of the other of said controllable planetary gearing members; a second one-way clutch means located between said other controllable member and said reaction means and inhibiting reverse rotation of the latter; and a third one-way clutch means effective between said output shaft means and said other controllable member and operable such that torque transmitted to said mechanism by said output shaft means will drive said turbine means and said reaction means as pump members for vehicle braking purpose when the speed of rotation of said output shaft means tends to exceed the speed of rotation of said other controllable member.

References Cited in the file of this patent
UNITED STATES PATENTS

| | | |
|---|---|---|
| 2,015,300 | Dell | Sept. 24, 1935 |
| 2,203,177 | Patterson | June 4, 1940 |
| 2,291,120 | Tipton | July 28, 1942 |
| 2,293,358 | Pollard | Aug. 18, 1942 |
| 2,298,648 | Russell | Oct. 13, 1942 |
| 2,298,649 | Russell | Oct. 13, 1942 |
| 2,312,849 | Pollard | Mar. 2, 1943 |
| 2,316,390 | Biermann | Apr. 13, 1943 |
| 2,549,125 | Paton | Apr. 17, 1951 |
| 2,578,450 | Pollard | Dec. 11, 1951 |
| 2,588,220 | Duffield | Mar. 4, 1952 |
| 2,590,472 | Soper et al. | Mar. 25, 1952 |
| 2,599,336 | Lemon | June 3, 1952 |
| 2,602,353 | Keller | July 3, 1952 |
| 2,737,061 | Kelley | Mar. 6, 1956 |
| 2,782,659 | Kelley | Feb. 26, 1957 |